United States Patent [19]

Minegishi

[11] 3,905,890

[45] Sept. 16, 1975

[54] METHOD AND APPARATUS FOR PURIFYING WASTE WATER

[76] Inventor: Toyomasa Minegishi, 1108,3-21-20, Nishiazabu, Minato-ku, Tokyo, Japan

[22] Filed: Apr. 19, 1974

[21] Appl. No.: 462,532

Related U.S. Application Data

[62] Division of Ser. No. 352,281, April 18, 1973.

[30] Foreign Application Priority Data

Dec. 20, 1972   Japan.................................. 47-2358

[52] U.S. Cl. ................ 204/276; 204/149; 204/152; 204/273; 204/275
[51] Int. Cl.² ....................... C02B 1/82; C02C 5/12
[58] Field of Search ........... 204/273, 275, 149, 276, 204/152

[56] References Cited
UNITED STATES PATENTS

| | | | |
|---|---|---|---|
| 758,430 | 4/1904 | Dunton .............................. | 204/273 |
| 823,671 | 6/1906 | Dieterich ....................... | 204/275 X |
| 2,687,996 | 8/1954 | Butler .............................. | 204/275 X |
| 3,558,455 | 1/1971 | Sorensen et al. ............... | 204/273 X |
| 3,582,485 | 6/1971 | Guter et al......................... | 204/149 |
| 3,691,041 | 9/1972 | Stralser........................... | 204/149 X |
| 3,728,235 | 4/1973 | Cooley et al..................... | 204/275 X |
| 3,756,933 | 9/1973 | Greenberg.......................... | 204/149 |
| 3,790,464 | 2/1974 | Greaves........................... | 204/149 X |

*Primary Examiner*—John H. Mack
*Assistant Examiner*—A. C. Prescott
*Attorney, Agent, or Firm*—McGlew and Tuttle

[57] ABSTRACT

A method of purifying waste water comprises carrying out an electrolysis of water in a defined area of a vessel in order to form oxygen and hydrogen therein and directing a flow of the waste water into the electrolysis area to subject the waste water to the influence of the newly formed oxygen and hydrogen to cause promotion of nuclei formation to cause a bonding coagulation of the waste material around the nuclei. A device for carrying out the invention includes a vessel for the water to be purified having an inner wall with an overflow for the water and for flocculated waste which is directed into a separating chamber for the removal of the solid waste material. The vessel includes a central tubular conduit having spaced electrodes which are subjected to a DC potential in order to produce an electrolysis in the area and the production of oxygen and hydrogen. The waste water is then circulated into the conduit in the electrolysis area and the contact with the hydrogen and oxygen causes the promotion of the formation of nuclei which produces the coagulation of the waste material. The newly coagulated waste material and the remaining liquid is then discharged into the liquid of the vessel and permitted to float to the top which includes an overflow portion for the separation of the purified liquid from the flocculated material. The vessel itself includes a filter at its bottom for the passage of the filtered liquid therethrough after the liquid has passed through the tube and is subjected to the hydrolysis effect to aid in the removal of the solid waste materials therefrom.

7 Claims, 6 Drawing Figures

METHOD AND APPARATUS FOR PURIFYING WASTE WATER

This is a division of application Ser. No. 352,281, filed Apr. 18, 1973.

BACKGROUND OF THE INVENTION

1. Field of the Invention

This invention relates in general to a method and apparatus for purifying liquids and, in particular, to a new and useful method and device for purifying waste water by subjecting the waste water to a localized water electrolysis for the promotion of the flocculation of the solid waste material therein and its subsequent removal.

2. Description of the Prior Art

It has been known to provide an industrial waste water purification system in which waste waters having living waste liquours are treated chemically to cause a coagulation and flocculating of the materials of the waste and these are subsequently subjected to a separating action and settling. For such a process a coagulant agent such as band sulfate, hydrochloric acid, sulfate iron, PAC or the like and high molecular coagulant are employed in order to induce coagulation of the waste particles contained in the waste water and to form a flock which is separated from the purified water so that the water and the flock may be separately recovered. The known prior art devices have the disadvantage that they must provide an apparatus for dewatering the treated waste waters and the further treatment of the sludge which is recovered and the known processes are difficult to carry out and very expensive.

SUMMARY OF THE INVENTION

The present invention provides a method and apparatus for purifying waste liquor which is suitable for the treatment of SS, COD (chemical oxygen demand) and BOD (Biochemical oxygen demand) in the purification of general industrial waste water, living waste liquors and the like. With the method and apparatus of the invention, electrolysis is carried out in an area within a vessel using an electrolyte of a sulfate, hydrochloric acid, caustic soda or a saline solution, sea water or the like and a small amount of electrical power and without requiring any chemical additions to the water being treated. In accordance with the method of the invention, electrodes are positioned within a tubular member located within a vessel containing the waste water and the waste water is introduced into an electrolysis area located between two spaced electrodes which are subjected to a direct current potential. The incoming waste water is subjected to the action of the newly formed oxygen and hydrogen of the electrolysis process to cause a formation of nuclei which creates the flocculation or coagulation of the waste materials so that they are quickly separated from the water. The inorganic particles which are present in the waste water, particularly protein starch powder, fat, heavy metal and the like are coagulated so as to form separable balls of the material which may be made to float on the water surface of the vessel and which may be easily separated from the purified water and collected.

In accordance with the method of the invention, the electrolysis is carried out in a small area of a vessel, for example in a central tubular conduit which has spaced electrodes and the waste liquid is passed directly to the electrolysis area for subsequent flow upwardly through the conduit and for discharge into the vessel around the conduit. As the waste liquid passes the electrolysis area, the waste materials tend to form balls of the waste material due to the formation of the nuclei which aids in the coagulation thereof as a result of the electrolysis action. The solid materials are then permitted to float in the vessel and are collected through a discharge passage and separated for removal. With the inventive arrangement the sludge may be treated in a single vessel without having to use a dewatering machine for the sludge.

The present invention utilizes the electrical properties of colloidal solution, so that when a colloidal solution is poured into an area with water used as a dispersion medium and an electric current is applied, the colloidal particles will be conductive and more toward the anode side or cathode side of the electrolysis area. Subsequently the liquid being treated is whirled outwardly in the dispersion medium and the colloidal particles in the water are coagulated into small balls and the liquid involved is water which is used as the dispersion medium, the colloidal particles are charged either positively or negatively to form either positive colloids or negative colloids. The colloid particle which moves toward the anode or the positive terminal by way of electrophoresis is charged with a negative charge and is called a negative colloid, whereas the one that moves through the negative terminal is called a positive colloid. The colloidal particle will be different in respect to the kind of charge in accordance with the dispersion medium. When water is the dispersion medium, for the negative colloids, there are sulfides such as Au, Ag, Pt, $As_2S_3$, Pbs, CdS, CuS, AgCl, AgI, Se, Te, China clay, clay, glass or the like, anf for the positive colloids there are hydroxides such as Fe, Al, Cr, Cu, Zn or the like, basic coloring matter, agar, gelatin, hemoglobin or the like.

Accordingly, the supplied amount of oxygen and hydrogen ion in the nascent state produced by electrolysis varies with the property of the colloid in the waste liquor. Thus, when considering the charge of the colloidal particle to positive or negative, if the particle itself is an electrolyte, electrolytic dissociation occurs (Arhenius' Theory of Electrolytic Dissociation), in which case the charge is produced. If one colloidal particle is charged to the negative, water surrounding the particle is charged to positive so that these negative and positive charges are separated in extremely narrow space relation to each other to form a so-called electrical double layer. In some other cases there is sometimes produced a charge by ion in the liquid being absorbed in the surface of the colloidal particles.

In one example, where hydrolysis takes place between $FeCl_3$ to dialyse HCl so as to form $Fe(OH)_3$ colloid, the $Fe^{+++}$ produced by electrolytic dissociation of $FeCl_3$ is absorbed into the $Fe(OH)_3$ to form a positive colloid. The periphery of this colloid is surrounded by $Cl^-$ to form an electrical double layer. These charged colloid particles are bound by the action of oxygen and hydrogen in the nascent state produced by way of electrolysis. This is therefore, naturally different from the conventional settling by the Brownian movement, which is a main principle of coagulation of colloids by the supply of an electrolyte such as metallic salt ($Al_2SO_4$, $Fl_2SO_4$ and the like).

Generally speaking, so-called flock or slurry formed by such coagulation as described above is a settled mass and is referred to as a "flock," connoting the form of a wool or cotton mass which is easily breakable and unstable. However, the coagulated matter formed in accordance with the invention, is solid matter which is not easily breakable and stabilized, and which is separated and removed by a pellet action in order to obtain purified water.

Accordingly, it is an object of the invention to provide a method of purifying water which comprises subjecting the waste water to an electrolysis in order to cause a formation of nuclei and the coagulation of the waste material around the nuclei.

A further object of the invention is to provide a device for purifying water which includes a vessel having a central conduit extending upwardly therethrough with spaced electrodes therein over which a potential is applied in order to form an electrolysis within the conduit and which includes means for directing waste liquids to be treated into the electrolysis area of the tube in order to cause the waste material to coagulate around the nuclei which are formed by the electrolysis action.

A further object of the invention is to provide a device for purifying water which includes a tube in which an electrolysis is carried out located within a vessel and wherein the tube has a plurality of radially extending discharges for directing the waste material which have been subjected to a hydrolysis action within the tube outwardly into the vessel and wherein the vessel includes means for the overflow of the flocculated materials and the liquor and their separate independent recovery.

A further object of the invention is to provide a device for purifying water which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENT

Figure 1:
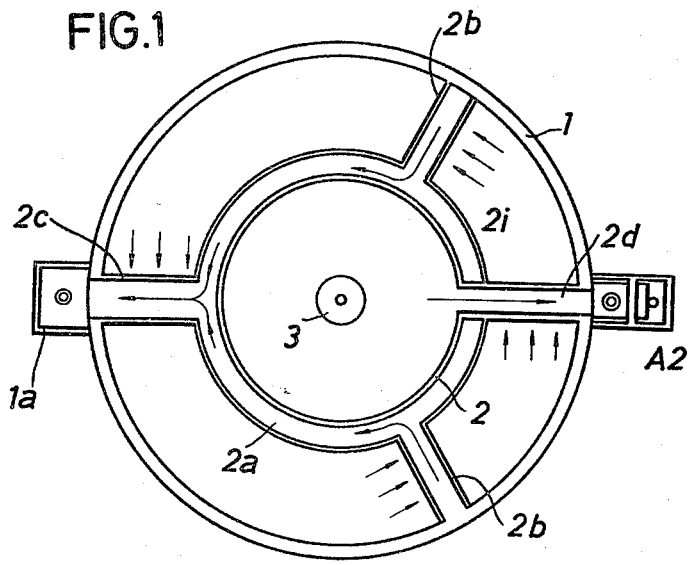
FIG. 1 is a top plan view of an apparatus for purifying liquid constructed in accordance with the invention.
Figure 2:
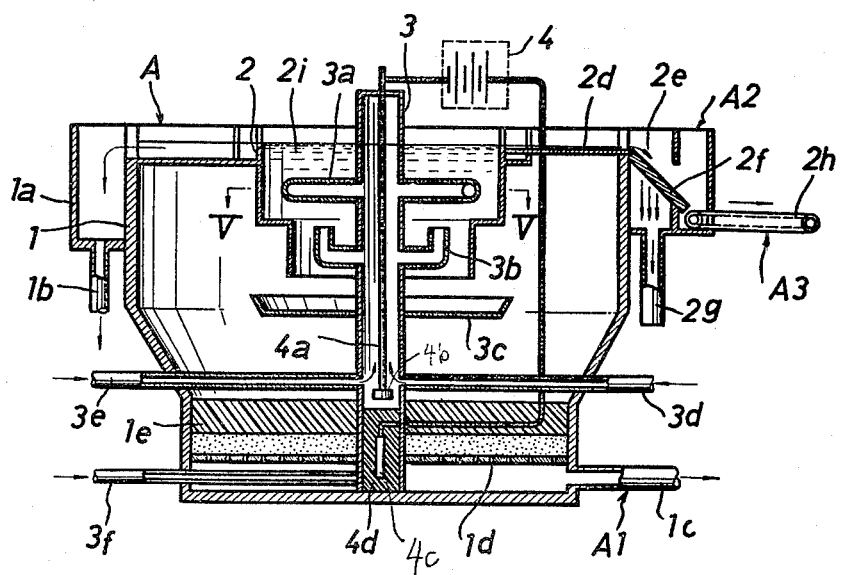
FIG. 2 is a transverse sectional view of the vessel shown in FIG. 1.
Figure 3:
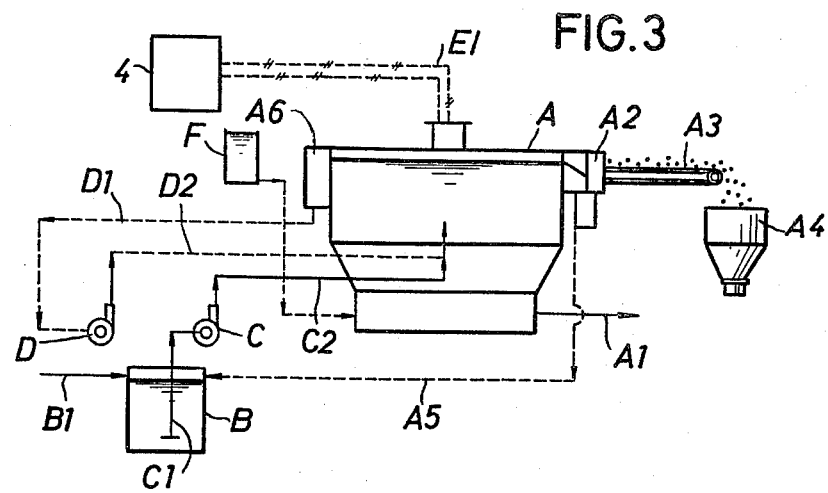
FIG. 3 is a schematic diagram indicating the connection conduits for the vessel shown in FIG. 2.
Figure 4:
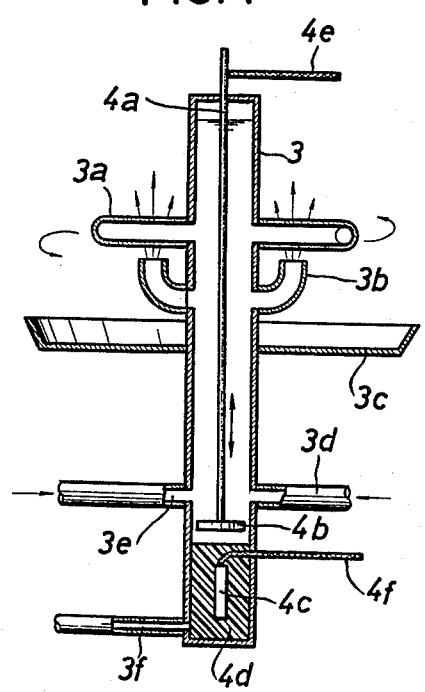
FIG. 4 is an enlarged sectional view of the electrolysis conduit of the vessel shown in FIG. 2.
Figure 5:
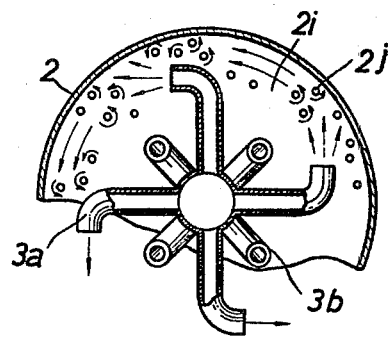
FIG. 5 is a section taken along the line V—V of FIG. 2.
Figure 6:
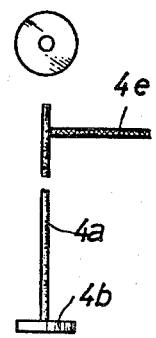
FIG. 6 is a partial side elevational view of the electrode shown in FIG. 4.

Referring to the drawings in particular, the invention embodied therein comprises a method and apparatus for treating waste liquids by directing them into a vessel A in which electrolysis is carried out in order to separate the solid materials therefrom. Waste water is stored in a pump pit B as shown in FIG. 3 and passed through a drain pipe and flows into the apparatus or vessel A by means of a head pump C passing through a suction pipe C1 and a delivery pipe C2. The water is purified in the vessel A by subjecting it to an electrolysis influence in order to cause flocculation of the solid material and the treated water is discharged from the apparatus A in the lower part thereof through a discharge connection or pipe or A1. Waste water containing pellet form sludge or ball shaped flocks flow down a separating trough 2d from the vessel A and passes over a screen 2f shown in FIG. 2, to permit the drain-off of the liquid and the separate passage of a pelletized sludge which is delivered into a hopper A4 by a conveyor belt A3. The extra water which is discharged from the screen separating chamber A2 is returned to the pump pit B through a return pipe A5. The remaining sludge which floats on the surface of the apparatus A flows down into the treated water reservoir A6 and is discharged through a conduit 1b to a connecting conduit D1 to a circulating pump D into a delivery pipe D2 for return treatment through the vessel. The sludge circulating pump D is continuously operated to maintain the balance of flow of water in the floated sludge. The apparatus of the invention, as shown in FIGS. 1 and 2 includes the vessel A which comprises an outer cylindrical wall 1 having a central tubular conduit or cylinder 3 extending vertically upwardly therein and spaced inwardly from inner walls 2. The inner cylinder 3 is provided with a plurality of whirling nozzles 3a which discharge radially into the space within the inner walls 2. The ends of the nozzles 3b extend at right angles to the radial direction in order to provide a whirling direction of flow of the waste liquid which has already been subjected to localized hydrolysis. The plurality of nozzles 3b have radial outer ends which extend upwardly for the vertical upward discharge of the liquid. A reverse flow receiving plate 3c is located below the nozzle 3b and they provide a reverse flowing action on the liquid directing it backwardly, upwardly into the space within the walls 2.

The apparatus includes sludge inflow circulating pipe 3e and an electrolytic solution supply pipe 3f which are connected to the inner space within the tubular conduit 3. An electrode holding bar 4a for holding a horizontal electrode plate 4b is located within the cylinder 3 and is connected exteriorly through a connecting cable 4e to a source of DC current supply such as a battery 4. An electrode 4c is connected to the opposite terminal of the battery through a connecting cable 4f and it is embedded within an electrode holding element 4d which fills the bottom of the inner cylinder 3. The space necessary for electrolytic action is maintained between the electrode 4b and the material 4d. A DC current is applied by the battery 4 to cause a localized electrolysis within the lower end of the cylinder 3.

The upper end of the cylindrical wall 2 is provided with an annular trough 2a having branch connections 2b, 2c, 2d. The branch connection 2d forms a run-off for the flocculated solid particles and some liquid and the branch connection 2c forms a run-off for the treated water. The trough 2c leads to a collecting container or trough 1a having a discharge pipe 1b which connects through the line B1 shown in FIG. 3. The solid materials which deliver along the conduit 2d flow into the chamber A2 over the screen 2f and the liquid is drained off through the screen 2f through the conduit 2g which connects back to the conduit A5. The solid materials are removed on the conveyor A3.

The lower portion of the vessel 1 carries a porous plate for supporting filter material and a filter material 1e for filtering the water which is being treated. The filtered water passes downwardly through the filter 1d and is collected for delivery through the conduit 1c.

The operation of the invention is as follows:

The vessel 1 is filled up with the waste liquid being treated. The head pump C and the sludge circulating pump D are started and run in a normal operating condition. A suitable amount of electrolytic solution comprising sulfuric acid, hydrochloric acid, caustic soda, saline solution and sea water is directed under pressure through the conduit 3d into the inner cylinder 3 and the electrodes are subjected to a DC potential by the battery 4.

When both the pump C and the sludge circulating pump D are operated electrolytic solution is supplied into the bottom of inner cylinder 3 for the electrolytic action through the inlet connection 3e or 3d from the reservoir F shown in FIG. 3.

The electrolytic action causes oxygen and hydrogen in a nascent state to be formed within the inner cylinder 3 at the surface of the plate 4b and over the material 4d. Oxygen forms at the positive pole and hydrogen at the negative pole. The gaseous bodies produced float inside the inner cylinder 3.

The waste water moving past the electrolysis area forms a plurality of nuclei which produce the flocculation or coagulation of the material therein into small pellets or balls. The flowing liquid is then directed through the nozzles 3b and 3a into the liquid within the walls 2 and the stirring action which it causes promotes the formation of the coagulation of the particles in the water around the various positive and negative nuclei. Inorganic and organic manner such as protein fat, carbohydrate and heavy metal which are the causes of "BOD" are collected to form a flock. The waste water moves upwardly in the cylinder 3 and changes to a whirling flow when it is directed outwardly from the nozzles 3a and upwardly by the nozzles 3b. The water in the space 2a i within the outer cylinder walls 2 collides against the walls so that the whirling flowing formation is increased. The nozzle 3a is designed to vary its angle of elevation so as to control the whirling flow speed. The injection flow moving out of the upwardly directed nozzle 3b reaches the water surface and is mixed with the transverse whirling flow to promote coagulation reaction. The coagulation forms around individual nuclei which gradually absorb more and more particles until they form a pellet size sludge or a ball of a diameter around 20 mm. In this phenomenon, SS (suspension), COD, BOD and matter which is the cause of N hexan are settled in the waste water. In other words, grain making takes place. If the whirling flow is stopped, the grain making no longer takes place.

The treated water is discharged out of the lower part of the chamber 2i and is directed transversely outwardly through the conduit 1c after it passes through the filter 1e. The filter 1e may be washed in a reverse washing action while using air or clean water when the system is shut down.

The treated water which is directed upwardly by the reverse plate 3c moves over the trough 2a and out through one of the branch troughs 2b or 2c and into a collecting reservoir 1a. The liquid and solid which arrive at the collecting reservoir 1a are directed back into the system through the conduit 1b.

The liquids and solids which are delivered through the conduit 2d arrive at the separation chamber A2 as described previously. The treated water which flows through the screen 2f is returned to the pump pit through the water discharge pipe 2g.

The invention provides an improved way of treating waste water using a hydrolysis action to form nuclei to form the waste material into numerous individual balls of matter surrounding each nuclei so that the solid matter may be easily separated from the liquid which is being purified. With the invention it is not required that coagulation chemicals such as band sulfate, iron, PAC, lime, high molecular coagulant be used, but only a simple saline solution. The DC power supply for electrolysis is around 0.1 kW/hr./ton. The conventional centrifugal type vacuum dewatering machine is not needed but only a simple screen arrangement for the separation of the final products. In addition, SS, COD, BOD, and N hexan can be removed by using one vessel.

While specific embodiments of the invention have been shown and described in detail to illustrate the application of the principles of the invention, it will be understood that the invention may be embodied otherwise without departing from such principles.

What is claimed is:

1. An apparatus for purifying water comprising a vessel for the water to be purified, having an inner wall, a central vertically arranged tubular conduit within said said vessel spaced inwardly from said inner wall and having an upper end with a discharge into said vessel, a positive and a negative electrode arranged in spaced relationship within said conduit adjacent the lower end thereof, means for supplying a potential to said electrodes to produce an electrolysis in said conduit to form hydrogen and oxygen, means for supplying electrolyte to said conduit adjacent the lower end thereof, means for circulating waste water to be treated into said conduit above the electrolyte and in the vicinity of said electrodes to cause a newly formed hydrogen and oxygen therein to promote the formation of nuclei for the coagulation of the waste material into flock, said vessel having an overflow for the continuous overflow of flocculated waste and water adjacent the top thereof and surrounding the discharge of said conduit, and means adjacent the bottom of said vessel for draining deflocculated liquid therefrom.

2. Apparatus according to claim 1, wherein said discharge at the upper end of said vessel includes substantially tangentially extending discharge nozzles located at spaced circumferential locations in order to produce a whirling flow.

3. An apparatus according to claim 1, wherein said discharge includes a plurality of tangentially and upwardly directed discharge nozzles for producing a whirling turbulent flow in said vessel, and a reverse flow plate surrounding said tubular conduit below said discharge nozzles for re-directing the flow upwardly in said vessel, said vessel having an outer wall spaced outwardly beyond said inner wall, said inner wall extending upwardly above said reverse flow plate.

4. A device according to claim 1, wherein said tubular conduit includes a plurality of radially extending discharge conduits forming said discharge opening into said vessel within said inner wall, said inner wall having an overlow for water and flocculated waste.

5. A device according to claim 4, including a plurality of troughs extending outwardly from said inner wall overflows, means defining a separating chamber having a screen therein over which the treated water may be passed connected to one of said overflows.

6. A device according to claim 5, wherein the lower end of said vessel has a discharge for pure water, and filter means located adjacent said discharge for the passage of the treated water therethrough.

7. An apparatus for purifying water comprising a vessel for the water to be purified, having an inner wall, a tubular conduit within said vessel spaced inwardly from said inner wall and having a discharge into said vessel, a positive and a negative electrode arranged in spaced relationship within said conduit, means for supplying a potential to said electrodes to produce an electrolysis in said conduit to form hydrogen and oxygen, means for supplying electrolyte to said conduit, and means for circulating waste water to be treated into said conduit in the vicinity of said electrodes to cause the newly formed hydrogen and oxygen therein to promote the formation of nuclei for the coagulation of the waste material into flock, said tubular conduit having a plurality of radially extending conduit portions having ends with nozzle discharges oriented at an angle to the radial conduit portions, said tubular conduit having a plurality of upwardly discharging conduit portions.

* * * * *